(12) United States Patent
Klein et al.

(10) Patent No.: US 10,877,513 B2
(45) Date of Patent: Dec. 29, 2020

(54) DEVICE AND METHOD FOR TRANSMITTING DATA BETWEEN TWO PHYSICAL INTERFACES

(71) Applicant: Spinner GmbH, Feldkirchen-Westerham (DE)

(72) Inventors: Thomas Klein, Holzkirchen (DE); Michael Lege, Bruckmühl (DE)

(73) Assignee: SPINNER GMBH, Feldkirchen-Westerham (DE)

( * ) Notice: Subject to any disclaimer, the term of this patent is extended or adjusted under 35 U.S.C. 154(b) by 0 days.

(21) Appl. No.: 16/651,209

(22) PCT Filed: Sep. 14, 2018

(86) PCT No.: PCT/EP2018/074878
§ 371 (c)(1),
(2) Date: Mar. 26, 2020

(87) PCT Pub. No.: WO2019/063318
PCT Pub. Date: Apr. 4, 2019

(65) Prior Publication Data
US 2020/0241591 A1    Jul. 30, 2020

(30) Foreign Application Priority Data

Sep. 26, 2017    (DE) .................. 10 2017 217 051

(51) Int. Cl.
*G06F 1/12*        (2006.01)
*H04J 3/06*        (2006.01)
(Continued)

(52) U.S. Cl.
CPC .............. *G06F 1/12* (2013.01); *H04J 3/0658* (2013.01); *H04L 7/0012* (2013.01); *H04L 7/0331* (2013.01)

(58) Field of Classification Search
CPC ...... H04B 5/00; H04B 5/0012; H04B 5/0031; H04B 5/0075; H04B 5/02
See application file for complete search history.

(56) References Cited

U.S. PATENT DOCUMENTS

2002/0013875 A1    1/2002    Dreps et al.
2007/0184704 A1*   8/2007    Blaak ................. H01R 13/6633
                                                              439/354
(Continued)

FOREIGN PATENT DOCUMENTS

DE        60002571 T2    4/2004
EP        1365555 A1    11/2003

OTHER PUBLICATIONS

International Search Report for PCT/EP2018/074878, dated Nov. 14, 2018; English translation submitted herewith (5 pgs.).

*Primary Examiner* — Kevin Kim
(74) *Attorney, Agent, or Firm* — Fitch, Even, Tabin & Flannery LLP

(57) ABSTRACT

The invention is a device and a method for transmitting data between two physical interfaces which in motion in relation to one another along a trajectory. The device has a data transmission unit disposed between the physical interfaces, and a local oscillator is assigned to the physical interfaces to inject a local system time prevailing at the location of one of the physical interfaces. The local oscillator has at least one of the physical interfaces for receiving and generating at least one clock signal which is transmitted to the data transmitter and the local oscillator at least at the other physical interface. The other physical interface has a receiver for the at least one clock signal transmittable via the data transmission unit and a synchronizer of the local system times based on the received clock signal; and a buffer memory.

14 Claims, 1 Drawing Sheet

(51) Int. Cl.
    *H04L 7/00*          (2006.01)
    *H04L 7/033*        (2006.01)

(56)             References Cited

U.S. PATENT DOCUMENTS

| | | | |
|---|---|---|---|
| 2016/0087780 A1 | | 3/2016 | Goswami et al. |
| 2017/0127465 A1* | | 5/2017 | McCormack ........ H04B 5/0031 |
| 2017/0195054 A1* | | 7/2017 | Ashrafi ................ H04B 10/532 |
| 2017/0270984 A1 | | 9/2017 | Xin |
| 2018/0295052 A1* | | 10/2018 | St-Laurent .............. H04L 47/50 |

\* cited by examiner

DEVICE AND METHOD FOR TRANSMITTING DATA BETWEEN TWO PHYSICAL INTERFACES

CROSS REFERENCE TO RELATED APPLICATION

Reference is made to PCT/EP2018/074878 filed Sep. 14, 2018, designating the United States, which claims priority to German Application No. 10 2017 217 051.4 filed Sep. 26, 2017, which are incorporated herein by reference in their entirety

BACKGROUND OF THE INVENTION

Field of the Invention

The invention relates to a device and a method for transmitting data between two physical interfaces which are disposed to be movable in relation to one another along a trajectory.

Description of the Prior Art

The data transmission rate, which indicates the digital data size that can be transmitted error-free within a time span, represents a measure of the performance of the transmission of digital data via a transmission channel. This indication usually relates to the smallest data unit, the bit, so that the bit rate in the unit bits provides the basis for the data transmission rate.

One particular challenge for the implementation of fast data transmissions, for example with transmission rates of 100 Mbit/s or 1 Gbit/s and more, is the error-free data transmission along a transmission channel which provides at least one of contactless and a dynamically variable data transmission unit, for example in the form of a contacting or contact-free rotary transmitter. In contrast to resistance-reduced continuous transmission lines, the aforementioned data transmission unit of a transmission channel causes interference which adversely affects the signal quality of the digital data to be transmitted. The interference source impairs error-free transmission of "fast data signals", that is data at high data rates.

FIG. 2 illustrates a structure which is known per se, in a block diagram of a digital data transmission between two physical interfaces 1, 2. A contactless coupling unit 3 is inserted along the data transmission channel U connecting the two physical interfaces 1, 2, for example in the form of a capacitive, inductive, electromagnetic, acoustic or optical interface which has two coupling units 31 and 32 which are disposed as at least one of being contact-free and movable relative to one another. Depending on the design of both physical interfaces 1, 2, a serializer/deserializer, SerDes, is in each case optionally disposed in between the physical interfaces 1, 2 and the contactless data transmission unit 3 in order to implement a serial data transmission via the contactless data transmission unit 3.

The extent of the interference caused by the data transmission unit 3 on the transmitted digital data which, in the case of a data transmission from the first to the second interface, are present at the second interface for further tapping can be illustrated and evaluated on the basis of an eye diagram which is illustrated in each of FIGS. 3*a* and *b*. In both diagrams, the signal level is plotted in each case along the y-axis, with the respective lower level corresponding to "0" and the upper level corresponding to "1". The switching times are along the x-axis which corresponds to the time axis, which the temporal real switching duration between bit the signals "0" and "1" can be found.

In the case of FIG. 3*a* which illustrates a data transmission rate of 1.25 Gbit/s, the horizontal and vertical aperture of an "eye" A is clearly indicated, which illustrates a good signal quality and is associated unequivocally, correct, and error-free signal detection at the receiving end. In the case of FIG. 3*b* which corresponds to a data transmission at a data transmission rate of 3.125 Gbit/s, the "eye" A closes significantly, as a result of which an error-free detection of received data is not or is not readily possible. Depending on the design of the data transmission unit, for example in the form of at least one of a contactless data transmission unit and two coupling elements mounted movably in relation to one another, amplitude fluctuations develop to a differing extent, on the one hand, along with the jitter which is characterized by temporal clock dither in terms of the frequency and phase position of the transmitted digital data signals.

If the data transmission takes place within a network structure, network protocols are required for a secured data exchange with the complexity of the network protocols being reflected in the OSI layer model. This model has seven layers building on one another from the first layer which is known as the physical layer which defines the requirements for all hardware components necessary for data transmission. If this layer is designed so that an error-free data transmission via the data transmission unit is guaranteed under all conditions of use, higher layers of the network protocols are not even used to perform data correction. Ethernet, as the most widespread protocol interface, nowadays forms a widely used standard, particularly in industrial applications. Particularly in industrial systems for the direct control and performance of processes, real-time capability is an essential prerequisite for digital transmission, for example between a transmission unit serving as a master and a receiving unit designated as a slave or a multiplicity of slaves of this type. The slaves are controlled by the master with time synchronization so that all receiver units which are designated as slaves can operate "hand-in-hand". Real-time capability is defined by the ability to predict as precisely as possible when a message provided by the transmitter will arrive at the respective receiver. The real-time-enabled communication protocols required for real-time operation define cycle times and a maximum jitter for the entire system in order to be able to guarantee an error-free functionality. The open industry Ethernet standard Profinet CC-C which specifies cycle times typically of 250 µs to a minimum of 31.25 µs and a total system jitter of <1 µs represents a real-time-enabled network protocol.

Document DE 600 02 571 T2 describes an elastic interface arrangement between two chips applied to a common carrier substrate. Each chip has an elastic interface unit which in each case has two storage units connected via a switching logic. A data value is output from the first or second storage unit depending on a control signal which can be applied to the switching logic.

U.S. Pat. No. 6,640,277 describes a synchronized data transmission between buses with a standardized communication protocol, wherein ring memories are used as buffer memories to equalize phase differences which occur.

US published patent application 2017/0127465 A1 describes a contactless data transmission which uses electromagnetic coupling in which the phase differences which occur are equalized by using a buffer storage of the data.

SUMMARY OF THE INVENTION

The invention is a device and a method for transmitting data between two physical interfaces which meets the requirements for real-time capability in the digital data transmission via a data transmission unit, wherein the data transmission unit implements either a contactless data transmission or a contact-based data transmission between two coupling units moving relative to one another. Along with the required real-time capability, the data transmission is intended to be performed in a protocol-independent manner so that a potential application, which is as customer-specific as possible, can be achieved. The data transmission according to the invention is furthermore intended to enable both a unidirectional and a bidirectional data transmission along a transmission channel.

The device according to the invention for transmitting digital data between two physical interfaces has a data transmitter disposed between the physical interfaces which transmit the data preferably in a contactless manner or transmits the data in a contact-based manner between two coupling device moving relative to one another. An oscillator is located in each case at each of the two physical interfaces which are preferably identical, in order to inject a local system time prevailing at the location of the respective physical interface. At least one of the two oscillators generates at least one clock signal and transmits it to the data transmitter. The local oscillator at least at the other physical interface has a receiver for receiving the at least one clock signal transmitted via the data transmission unit and additionally provides synchronization of the local system times on the basis of the received clock signal. The particular feature of synchronizing the local system times at both physical interfaces is based on the transmission of the at least one clock signal via exactly the same transmission channel by which the digital data, also referred to as payload, are also transmitted between both physical interfaces.

A system-based, randomly occurring phase shift in the data transmitted via the data transmitter, to which the at least one transmitter clock signal is also subjected, is equalized according to the invention by use of a buffer memory provided by the physical interface receiving the data in which the data transmitted by data transmitter can be temporarily stored.

The buffer memory is designed with a memory capacity assignable to the buffer memory which is chosen depending on a maximum temporal phase shift occurring in the data transmitted during the data transmission.

A constant or a temporally varying phase shift occurs during the data transmission depending on the type and design of the data transmitter. In both cases, the memory capacity is to be chosen as a constantly predefined quantity for the purposes of the phase shift compensation. A further design uses a physical interface receiving the data to detect the phase shift occurring during the data transmission. In this case, a further capability is provided by the physical interface receiving the data, which suitably defines the memory capacity of the buffer memory depending on the detected maximum phase shift.

In a particularly advantageous manner, a ring memory in which the data are temporarily stored for the purposes of the phase shift compensation is suitable as a buffer memory. In order to be able to use the smallest possible storage volume, the data are stored in the ring memory and are cyclically overwritten depending on the memory capacity. In this way, the latency, that is the transit time of the data between the reception by the one physical interface and the transmission by the other physical interface and vice versa, and the jitter which influences the temporal modification of a bit change in the data signal can be reduced to a minimum and the real-time capability of the system can be enabled.

The device according to the invention for transmitting data is limited exclusively to hardware components whose arrangement and function in terms of the synchronization of the local system times and the phase shift compensation relate exclusively to the direct bit transmission, which are assigned to the first layer described in the OSI model, referred to as the bit transmission layer or physical layer. For this reason, the device according to the invention enables a protocol-independent implementation into already existing communication networks so that no or only minor customer-specific adaptations are required for use.

The physical interfaces are suitably designed for the transmission and forwarding in each case of a smallest data unit in the form of a data bit or symbol and can be designed according to demand and requirements as electrical, electromagnetic, acoustic or optical interfaces via which the data are transmitted with a standardized known communication protocol.

The physical interfaces are advantageously connected in each case to a suitably designed coupling element or part of such a coupling element which ensures a mechanically stable and a technologically low-loss or loss-free data transmission. As mentioned above, a local oscillator, which is connected to the respective coupling element and preferably forms one structural unit, which is disposed in each case at the location of a respective physical interface.

In the case of a parallel-designed physical interface via which a plurality of bits are transmitted in parallel, a converter for converting a parallel data stream into a serial data stream is advantageously required in each case for the purposes of a serial transmission of the data via the data transmission unit between the data transmission unit and the physical interfaces. The serializers/deserializers, SerDes, which are known per se are used for this purpose.

The principle underlying the device according to the invention for transmitting data between two physical interfaces via a data transmission unit initially provides the generation of at least one clock signal by one of the two physical interfaces. The clock signal is then transmitted via the same data transmission channel via which all data are also transmitted as the data payload. The clock signal transmitted via the data transmission channel is used by the receiving physical interface for the purpose of a synchronization of the local system times at both physical interfaces. After the establishment of a time synchronization between both local system times at both physical interfaces, the data to be transmitted are transmitted via the data transmission channel and are temporarily stored in a buffer memory at the receiving end. The transmitted data are temporarily stored within the buffer memory with a memory capacity which is adapted to a maximum temporal phase shift occurring in the transmitted data during the data transmission in such a way that the data read from the buffer memory can be transmitted via the physical interface in phase synchronization with the locally prevailing clock phase. The data are stored cyclically within the buffer memory which is preferably designed as a ring memory so that the phase shift compensation can be implemented with a low storage volume.

BRIEF DESCRIPTION OF THE DRAWINGS

The device according to the invention and the method on which the device is based are explained in detail with reference to the drawings described below.

The invention is described below by way of example on the basis of example embodiments with reference to the drawings without restricting the general inventive concept. In the drawings.

DETAILED DESCRIPTION OF THE INVENTION

Figure 1:
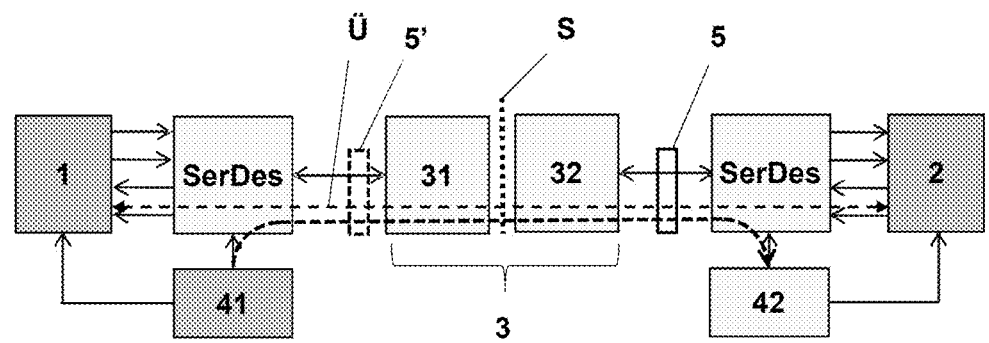
FIG. 1 shows a block diagram for data transmission in real time.
Figure 2:
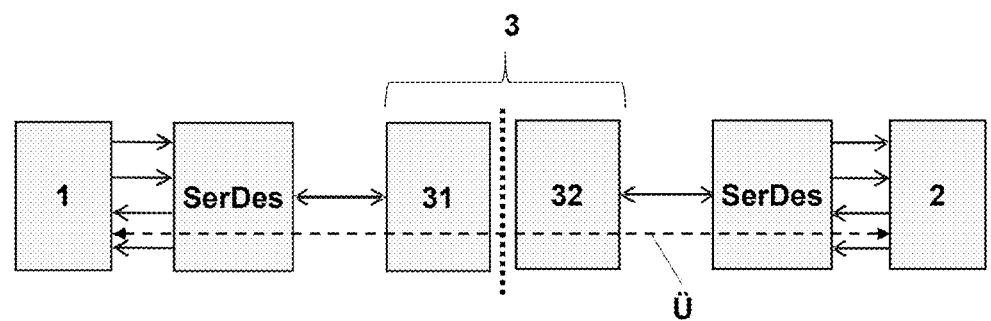
FIG. 2 shows a block diagram for data transmission via a data transmission unit according to the prior art.
Figure 3:
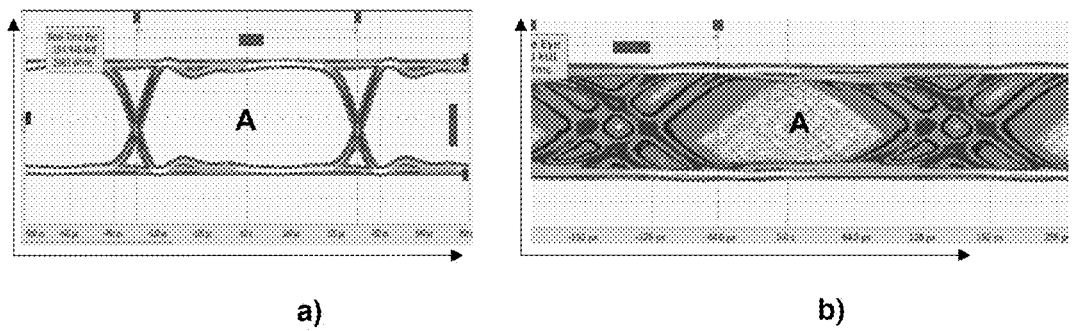
FIGS. 3a-b show "eye" diagrams.

FIG. 1 shows a block diagram which represents a device according to the invention for transmitting data between two physical interfaces 1, 2 which are in each case are of identical design. A contactless data transmission unit 3 is disposed along the transmission channel Ü connecting the two physical interfaces 1, 2. The data transmission unit 3 is designed, for example, in the form of a capacitively or inductively operating electrical data transmission unit which is disclosed, for example, in DE 44 129 58 A1. In one example embodiment described, there for transmitting data between two coupling units 31, 32 mounted rotatably in relation to one another, one coupling unit 31 provides an annular-shaped conductor structure which is disposed separated by a gap S from the other coupling unit 32 which provides stationary electrical electrode arrangement. Alternative design forms for configuring the data transmission unit 3 are obviously also conceivable, for example in the form of a contactless optical or electromagnetic or acoustic data transmission unit 3 or in the form of a contact-based data transmission unit 3 designed in a loop.

Oscillators 41, 42 are disposed in each case at each of the physical interfaces 1, 2 in order to be able to perform the data transmission between both physical interfaces 1, 2 in an error-free manner. Both oscillators 41, 42 need to be synchronized in order to perform the data transmission with only a short delay time and with high bus loads, such as if possible using the entire transmission capacity of the transmission channel. The time synchronization of both oscillators is performed according to the invention using at least one generated clock signal, for example at the location of the oscillator unit 41. The clock signal is transmitted via the same transmission channel U via by which the payload is also transmitted from one physical interface to the other.

In the case of the example embodiment illustrated in FIG. 1, it is assumed that both physical interfaces 1, 2 are designed as parallel interfaces. In order to obtain a conversion of the parallel data format into a serial data format suitable for transmitting the data via the data transmission unit 3, a serializer/deserializer, SerDes, is disposed in each case between the physical interface 1, 2 and the data transmission unit 3 via which the at least one clock signal is also transmitted for the purposes of the time synchronization of the local system times on both oscillator units 41, 42.

The phase shift which randomly develops during the data transmission of the digital payload signals and which changes, particularly in the case of a rotating data transmission unit 3, is equalized for its compensation using a buffer memory 5 disposed at the receiving end. To do this, the payload is temporarily stored in a cyclical manner in the buffer memory 5 which is preferably designed in the form of a ring memory before being forwarded via the local clock to the physical interface 2 at the receiving end.

In the case of a unidirectional data transmission, for example from the physical interface 1 to the physical interface 2, the oscillator 41 serves as a master oscillator and the oscillator 42 disposed at the receiving end serves as a slave oscillator. A corresponding synchronizer for time synchronization is disposed on the slave oscillator 42 for synchronization purposes. Similarly, the buffer memory 5 is also disposed at the receiving end.

In the case of a bidirectional data transmission, at least one buffer memory 5 is to be provided on both sides of the data transmission unit 3. See also the buffer memory 5' on the side of the physical interface 1 indicated by a broken line in FIG. 1. In the case of a bidirectional data transmission, both oscillator units 41, 42 are not necessarily, but are advantageously also are designed for the generation and reception of clock signals. Conversely, if the clock signal is also made available on the customer side along with the data to be transmitted, the generation of a clock signal by the oscillator is not required. In this case of the external feed of the clock signal separately or jointly with the data to be transmitted, the externally fed clock signal can be used for the synchronization of the local system times in each case at the first and second interface.

With the device according to the invention, data could be transmitted error-free under real-time conditions via a rotatable data transmission unit 3. Cycle times of 1.12 µs could be implemented which are far below the cycle time of 250 µs or the minimum of 31.25 µs required by the Profinet CC-C application. The empirically proven jitter of 25 ns is furthermore far below the maximum jitter of <1 µs specified by the Profinet CC-C application. The device according to the invention therefore has a largely unrestricted compatibility with existing network structures.

REFERENCE NUMBER LIST 1, 2 Physical interface
3 Data transmitter
31, 32 Coupling device
41, 42 Oscillator
5, 5' Buffer memory
Ü Transmission channel
A Eye aperture
SerDes Serializer/Deserializer

The invention claimed is:
1. A device for transmitting digital data, comprising:
physical interfaces comprising a first interface attached to a rotating device and a second physical interface attached to a stationary device;
an annular data transmitter, disposed between the physical interfaces which transmits the digital data on a data transmission channel;
a local oscillator, assigned to the physical interfaces, for injecting a local system time at a location of one of the physical interfaces, wherein the local oscillator includes at least at one of the physical interfaces for generating at least one clock signal and which transmits the at least one clock signal to the annular data transmitter and a local oscillator located at the other physical interface includes a receiver for receiving the at least one clock signal which is transmitted by the annular data transmitter on the data transmission channel, and a synchronizer for synchronizing the local system time based on the received at least one clock signal; and a buffer memory, located at the physical interface, for temporarily storing the digital data transmitted by the data transmitter and the buffer memory has a memory capacity depending on a temporal phase shift occurring in the digital data transmitted during the data transmission between a first device rotating relative to a second stationary device and comprises means for detecting the temporal phase shift occurring during data transmission and means for defining the memory capacity depending on the temporal phase shift during the data transmission.

2. The device as claimed in claim 1, wherein:
the physical interfaces are identical.

3. The device as claimed in claim 1, wherein:
the buffer memory is a ring memory.

4. The device as claimed in claim 1, wherein:
the physical interfaces transmit and forward data bits.

5. The device as claimed in claim 1, wherein:
the data transmitter transmits digital data contactlessly.

6. The device as claimed in claim 5, wherein:
the data transmitter that transmits data contactlessly is one of a capacitive, inductive, acoustic, electromagnetic or optical coupling device.

7. The device as claimed in claim 1, wherein:
the physical interfaces are one of an electrical, electromagnetic, acoustic or optical interface via which the digital data are transmittable with a standardized communication protocol.

8. The device as claimed in claim 1, wherein:
the physical interfaces are connected to a coupling element which is connected to one of the oscillators.

9. The device as claimed in claim 1, comprising:
a converter for converting a parallel data stream into a serial data stream to enable the data transmission unit and the physical interfaces to transmit the digital data in a serial data sequence via the data transmitter.

10. A method of use of the device in accordance with claim 1 comprising the steps of:
generating and receiving a clock signal by one of the two physical interfaces;
transmitting the clock signal occurs via the data transmission channel;
receiving the clock signal by another of the two physical interfaces;
synchronizing the local system times occurs at both physical interfaces;
transmitting the digital data occurs via the data transmission channel;
temporarily storing of the transmitted digital data occurred at one of the physical interfaces receiving the digital data; and
reading the digital data from a memory and providing the digital data at the other physical interface.

11. A method of use of the device in accordance with claim 10, comprising:
temporarily storing the digital data in a cyclical manner with a ring memory.

12. A method of use of the device in accordance with claim 11, wherein:
transmitting the data contactlessly.

13. A method of use of the device in accordance with claim 12, wherein:
temporarily storing the transmitted digital data in a memory having storage capacity chosen according to a maximum temporal phase shift occurring in digital data transmitted during the data transmission between the first rotating device relative to the second stationary device.

14. A method of use of the device in accordance with claim 13, wherein:
Obtaining the clock signal with the digital data at one of the two physical interfaces.

* * * * *